Patented Nov. 27, 1934

1,982,407

UNITED STATES PATENT OFFICE 1,982,407

PROCESS OF PRODUCING HYDROGEN CYANIDE

Thomas Sherlock Wheeler, Northwich, England, assignor to Imperial Chemical Industries Limited, London, England, a British company No Drawing. Application March 13, 1930, Serial No. 435,663. In Great Britain March 27, 1929

7 Claims. (Cl. 23—151)

The invention relates to the production of hydrocyanic acid by the interation at high temperatures between ammonia and hydrocarbon gases. The expression "hydrocarbon gases" includes hydrocarbons such as methane, ethane and the lower members of the paraffin series, unsaturated and aromatic hydrocarbons, natural or industrial gases containing such hydrocarbons, or other hydrocarbons which are gaseous under the working conditions and which react to produce hydrocyanic acid gas.

The reactions which take place may be typically expressed by the following equations:

with methane:—

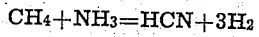

$$CH_4 + NH_3 = HCN + 3H_2$$

or with ethane:—

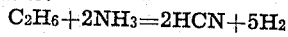

$$C_2H_6 + 2NH_3 = 2HCN + 5H_2$$

It will be seen that other undesired reactions may also occur, and in particular decomposition of ammonia into its elements, decomposition of hydrocarbons to form solid carbon, and polymerization or decomposition of the hydrocyanic acid formed, should be avoided.

It has already been proposed to effect reaction between methane and ammonia at high temperatures to form hydrocyanic acid and also to form hydrocyanic acid gas and carbon. It is found that the formation of carbon is exceedingly inconvenient from the point of view of operation of a continuous process since carbon deposits necessitate frequent stoppages for purging otherwise the apparatus becomes choked. The ideal process would combine maximum yield of hydrocyanic acid gas with the minimum production of carbon and the minimum decomposition of ammonia into its elements. In practice it is difficult to reconcile these requirements since different conditions affect these requirements differently. For example high temperature increases yield of hydrocyanic acid but increases decomposition of methane and ammonia into their elements; if it is attempted to overcome the undesired decomposition by rapid passage of gas, the yield of hydrocyanic acid falls off after a certain point. Again, the shape and nature of the reaction chamber affects the main reaction and the side reactions differently.

In a co-pending application, there is described a process, in which, inter alia, an excess of ammonia is employed. This is believed to be the best method but it has been found that the process can be worked, although not so efficiently, with the stoichiometric quantity of ammonia or even slightly less, provided that a substantial quantity of a diluent such as hydrogen or nitrogen is present. Accordingly, the present invention consists primarily in a process in which hydrocarbon is caused to react with the stoichiometric quantity of ammonia, or even with slightly less ammonia, in presence of a large quantity of hydrogen as a diluent, by passing the gases rapidly at a temperature of not less than 1150° C. through an unpacked reaction chamber under conditions unfavourable to the decomposition of the reagents into their elements.

The invention also consists in certain further improvements which are of value whether a deficiency of ammonia is employed or not, as hereafter claimed.

It has further been found that observance of the following conditions is required if maximum efficiency is to be attained.

(1) The temperature should be as high as possible. In practice there is considerable difficulty in measuring the actual gas temperature and such gas temperature must be inferred from the temperature of the walls of the reaction chamber, due allowance being made for the size of the chamber. The inner wall temperature must be at least 1150° C. and with a wall temperature of around 1350–1450° C. the process can be carried out so as to give practically complete conversion.

(2) The time of exposure of the reaction mixture to the (inner wall) temperature exceeding 1150° C. should be short, as otherwise there will be a tendency for decomposition of ammonia and hydrocarbon into their elements to occur, the latter leading to separation of carbon. The gas mixture should therefore be passed rapidly through the reaction zone. It is also advisable to bring the gas mixture as rapidly as possible to the reaction temperature by rapid heating, at any rate in the final stages of the heating. It is most advantageous to preheat the gas mixture and it has been found that it is possible to preheat to temperatures of 900° C. or over, or even to 1000° C., without sensible decomposition, when the preheating is carried out rapidly. The remainder of the heat is then imparted very rapidly by passage through the reaction chamber as described. It is also desirable to cool the gases very rapidly immediately reaction has taken place. The waste heat may be utilized, by heat interchange, for preheating.

(3) The nature of the reaction chamber should be such as to avoid as far as possible decomposition of ammonia and hydrocarbon into their elements. In practice this means that the presence of surfaces other than those necessary for imparting the required amount of heat to the reaction zone are avoided, and also care is taken that the surfaces are not of such a nature as to tend to cause decomposition. For example, smooth surfaces should be preferred to rough ones, and materials should not be used which contain substances liable to provoke cracking, e. g. bricks containing iron oxide. Suitable materials are glazed silica or sillimanite. The reaction chamber should be unpacked, that is, it should not contain either inert or catalytic materials apart from the bounding surfaces as the extended surface thereby offered to the gases is liable to cause decomposition thereof.

The foregoing remarks indicate the general desiderata in carrying out the improved process for the production of hydrocyanic acid. The raw materials can be derived from many sources, for example, suitable hydrocarbon gases exist in natural gas, coal gas, coke oven gas, gas from oil cracking plants or from destructive hydrogenation plants, and such gases may be used directly or after preliminary treatment, e. g. pyrolysis to form benzene hydrocarbons which are then removed, or after enrichment in hydrocarbons by any suitable method provided that a suitable quantity of hydrogen is present e. g. coke oven gas or gas been added to gases deficient therein, e. g. natural gas. It will generally be preferred to utilize a hydrocarbon containing gas as it occurs in nature or as it is produced in some industrial process, without taking special steps to remove foreign constituents such as carbon monoxide or nitrogen. Ammonia will generally be available in the liquid phase as aqueous solution or as liquid anhydrous ammonia, and in this case the requisite mixture of ammonia hydrogen and hydrocarbon gas is most simply obtained by utilizing the hydrocarbon and hydrogen mixture to vaporize the ammonia. Sulphur compounds should not be present in the hydrocarbon ammonia mixture and if necessary steps should be taken to purify the raw materials therefrom. It is useful to remove carbon dioxide. Crude coke oven gas, for example, can be freed from sulphur compounds and carbon dioxide sufficiently for the purpose of the reaction by treatment with ammonia liquor and this treatment can at the same time be adapted to charge the gas with the necessary amount of ammonia for the reaction.

The presence of moisture is useful in that it appears to reduce carbon formation and unless moisture is present already in the gas, it is preferred to add it, for example 2% by volume. This feature is broadly useful in the formation of hydrocyanic acid from hydrocarbons and ammonia.

*Example*

A gas mixture consisting of 34.4% of ammonia (93% theoretical) and the remainder coal gas (methane 32.6:H —35%) was passed at a space velocity of 85 reciprocal minutes (that is 85 volumes of hot gas are passed per minute through unit volume of reaction space) through a silica tube of 8.6 cms. internal diameter and 60 cms. effective heated length, heated in a gas fired furnace to 1500° C. The hydrocyanic acid produced was recovered by passing the exit gases through 20% caustic soda solution, and ammonia by absorption in strong sulphuric acid. Under these conditions there was no appreciable decomposition of ammonia, very small decomposition of hydrocarbon (about 7%) while 48.6% of hydrocarbon and 52.3% of ammonia were converted to hydrocyanic acid.

A suitable type of reaction chamber is long and deep in relation to its width. A number of such units may be built side by side with heat flues interposed so as to form an apparatus of sandwich construction. Plane walls of sillimanite may be disposed about 2" apart to form narrow reaction chambers heated on either side.

I declare that what I claim is:—

1. The process of producing hydrocyanic acid which consists in passing a gas containing a hydrocarbon and a substantial quantity of a diluent with not more but not much less than one molecular proportion of ammonia for each atomic proportion of carbon at a temperature of at least 1150° C. through an unpacked reaction chamber under conditions unfavourable to the decomposi- of the reagents into their elements.

2. The process of producing hydrocyanic acid which consists in passing a gas containing a hydrocarbon and a substantial quantity of hydrogen with slightly less than one molecular proportion of ammonia for each atomic proportion of carbon at a temperature of at least 1150° C. through an unpacked reaction chamber under conditions unfavourable to the decomposition of the reagents into their elements.

3. The process as in claim 1, in which moist gases are treated.

4. A process as claimed in claim 1 in which the mixture is preheated to about 1000° C.

5. The process as claimed in claim 1 in which the hydrocarbon consists mainly of methane.

6. The process as defined in claim 1, in which the diluent consists of nitrogen.

7. A process comprising preparing a mixture of ammonia gas, water vapor and hydrocarbon vapor and heating the mixture to obtain hydrogen cyanide.

THOMAS SHERLOCK WHEELER.